United States Patent [19]
Cooper et al.

[11] Patent Number: 5,892,856
[45] Date of Patent: Apr. 6, 1999

[54] METHOD OF PRESENCE DETECTION USING VIDEO INPUT

[75] Inventors: Frederick J. Cooper, Portland; Rune A. Skarbo, Hillsboro, both of Oreg.

[73] Assignee: Intel Corporation, Santa Clara, Calif.

[21] Appl. No.: 772,644

[22] Filed: Dec. 23, 1996

[51] Int. Cl.⁶ .............. G06K 9/36; G06K 9/00; G06K 9/68; G06K 9/20
[52] U.S. Cl. .......... 382/291; 382/103; 382/220; 382/283; 348/152; 348/154
[58] Field of Search ................ 382/103, 209, 382/213, 219, 220, 282, 283, 291, 212; 348/143, 152, 154

[56] References Cited

U.S. PATENT DOCUMENTS

| | | | |
|---|---|---|---|
| 5,034,986 | 7/1991 | Karmann et al. | 382/103 |
| 5,243,418 | 9/1993 | Kuno et al. | 382/103 |
| 5,253,070 | 10/1993 | Hong | 358/209 |
| 5,280,530 | 1/1994 | Trew et al. | 382/103 |
| 5,339,104 | 8/1994 | Hong | 348/155 |
| 5,438,360 | 8/1995 | Edwards | 348/208 |
| 5,550,928 | 8/1996 | Lu et al. | 382/103 |

OTHER PUBLICATIONS

U.S. Application No. 08/725,215, entitled "A Mechanism for Increasing Awareness and Sense of Proximity Among Multiple Users in a Network Systems, " filed Sep. 26,1996, attorney docket no. 42390.P3478.

*Primary Examiner*—Bipin Shalwala
*Attorney, Agent, or Firm*—Kenyon & Kenyon

[57] ABSTRACT

A method of detecting whether a user is in close proximity to an end point. A base video frame of the end point is captured when the user is not in close proximity to the end point. A current video frame of the end point is captured and compared to the base video frame of the end point to determine whether the user is in close proximity to the end point.

30 Claims, 8 Drawing Sheets

METHOD OF PRESENCE DETECTION USING VIDEO INPUT

CROSS-REFERENCE TO RELATED APPLICATION

The subject matter of the present invention is related to the subject matter of U.S. patent application Ser. No. 08/725,215, attorney docket number 42390.P3478, entitled "A Mechanism For Increasing Awareness and Sense of Proximity Among Multiple Users In A Network System," to Anthony C. Salvador, Rune A. Skarbo, Christopher C. Lawless, Frederick J. Cooper, Kathleen J. Kovatch, and Douglas L. Sorensen, and assigned to Intel Corporation, filed Sep. 26, 1996, the disclosure of which is incorporated herein by reference in its entirety.

BACKGROUND

The present invention relates to presence detection systems. More particularly, the present invention relates to a method and apparatus for presence detection using a video input.

In the modern business world, multiple individuals typically work together as a team to obtain a particular goal. The physical location of each team member can vary greatly. For example, different team members may be located in different rooms in the same building, in different buildings at the same location, or in different cities. Having different team members distributed throughout different locations, however, can inhibit the overall communication and effectiveness of the team.

Presently, it can be difficult to communicate with team members that are frequently out of their offices for meetings, travel, etc. Team members are forced to leave voice mail messages asking the team member to return their phone call. Alternatively, if the team members are located in the same building and the team member has not returned phone calls, the person may frequently call the team member or walk down to the team member's office to check whether the team member is present in his office. However, this results in a significant waste of time.

Therefore, there exists a need for a method and apparatus for automatically and accurately detecting the presence or absence of an individual.

SUMMARY OF THE INVENTION

A method and apparatus for presence detection is described herein. According to one embodiment of the present invention, a method is provided for detecting whether a user is in close proximity to an end point. A base video frame of the end point is captured when the user is not in close proximity to the end point. A current video frame of the end point is captured and compared to the base video frame of the end point to determine whether the user is currently in close proximity to the end point.

DETAILED DESCRIPTION

Figure 1:
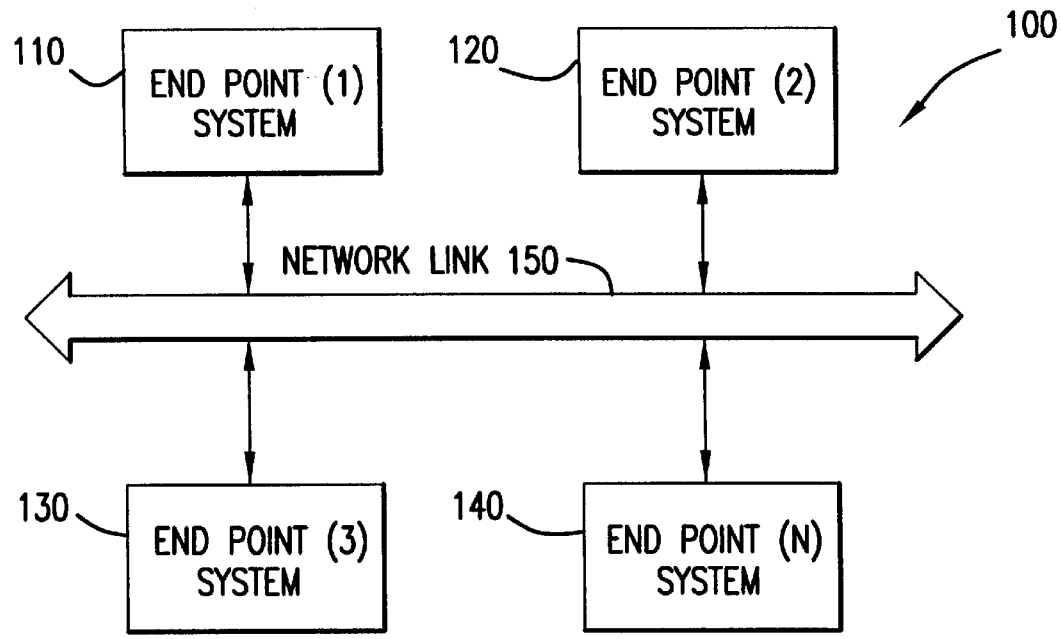
FIG. 1 illustrates a network environment such as may be used with one embodiment of the present invention.

Referring to the drawings in detail, wherein like numerals indicate like elements, FIG. 1 illustrates a network environment 100 such as may be used with one embodiment of the present invention. Network environment 100 includes multiple end point systems, where each end point system is located at a different end point. The end point systems include end point system 110 located at a first end point, end point system 120 located at a second end point, end point system 130 located at a third end point, and end point system 140 located at a fourth end point. Each of end point systems 110–140 are coupled together via a network link 150. Network link 150 can be any combination of any one or more of a wide variety of conventional networks, such as a local area network (LAN), a wide area network (WAN), the Internet, the World Wide Web, an Intranet, etc. The end points may comprise a user's office, home, automobile, aircraft, or any space where it is desirable to detect the presence or absence of a person or object at the end point.

Figure 2:
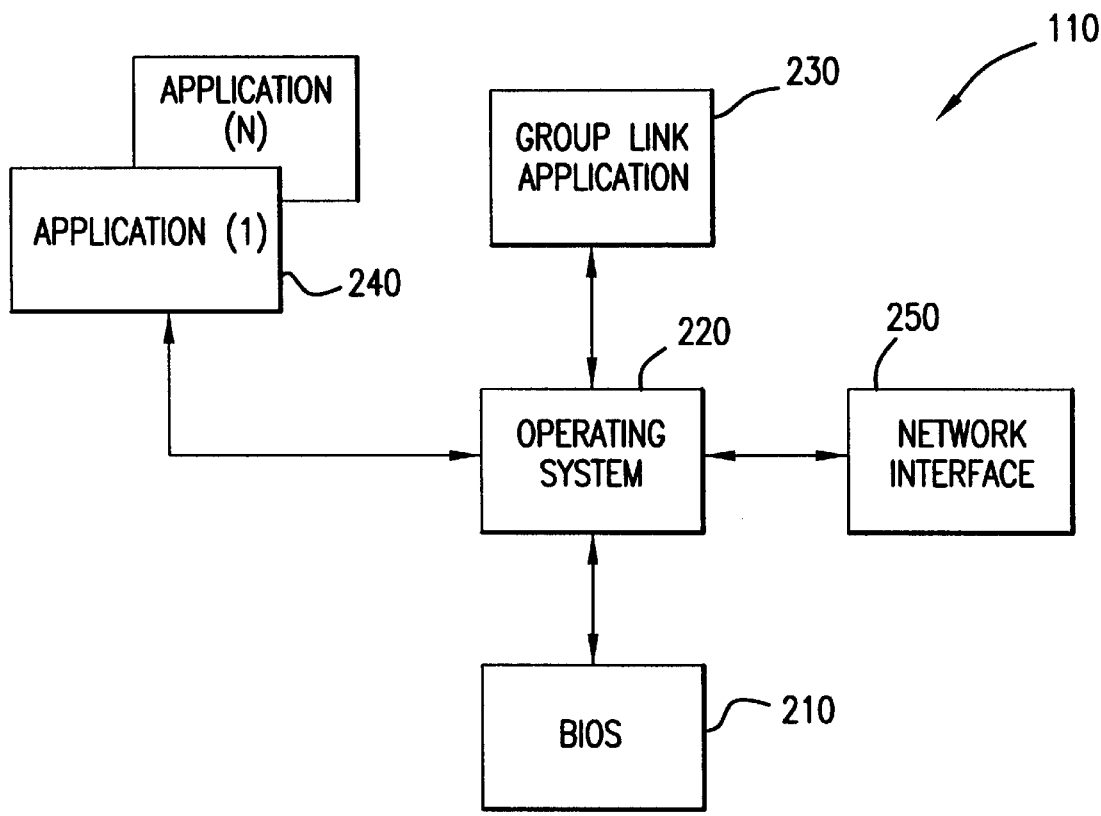
FIG. 2 is a simplified block diagram illustrating the architecture of a system which may be used with an embodiment of the present invention.

FIG. 2 is a block diagram of end point system 110, such as may be used with one embodiment of the present invention. End point systems 120, 130 and 140 can be similar or the same as end point system 110. End point system 110 comprises a computer having a basic input/output system (BIOS) 210, an operating system 220, a GroupLink application 230, and a network interface 250. BIOS 210 provides an interface between operating system 220 and the various input/output (I/O) devices coupled to the system. Operating system 220 is a software program which provides an interface between BIOS 210 and applications 240 running on end point system 110. Operating system 220 also provides an interface, such as a graphical user interface (GUI), between the user and end point system 110. Operating system 220 may be any conventional operating system, such as Windows® 95, available from Microsoft Corporation, Redmond, Wash. GroupLink application 230 detects whether or not a user is in close proximity to an end point (i.e., detects whether or not a user is present in his office).

Network interface 250 provides an interface to a network (such as network link 150) for end point system 110 to communicate with other end point systems. In one embodiment of the present invention, network interface 250 supports the Transmission Control Protocol/Internet Protocol (TCP/IP) protocol. By way of example, network interface 250 may be a Windows Sockets 1.1 interface, or a Windows Sockets 2 interface.

In the following discussions, reference is made to "observer" end point systems and "observee" end point systems. An end point system which is providing information regarding the proximity of a user to the end point is referred to as the observee end point system. An end point system which is receiving information describing whether a user is in close proximity to another end point is an observer end point system.

Figure 3:
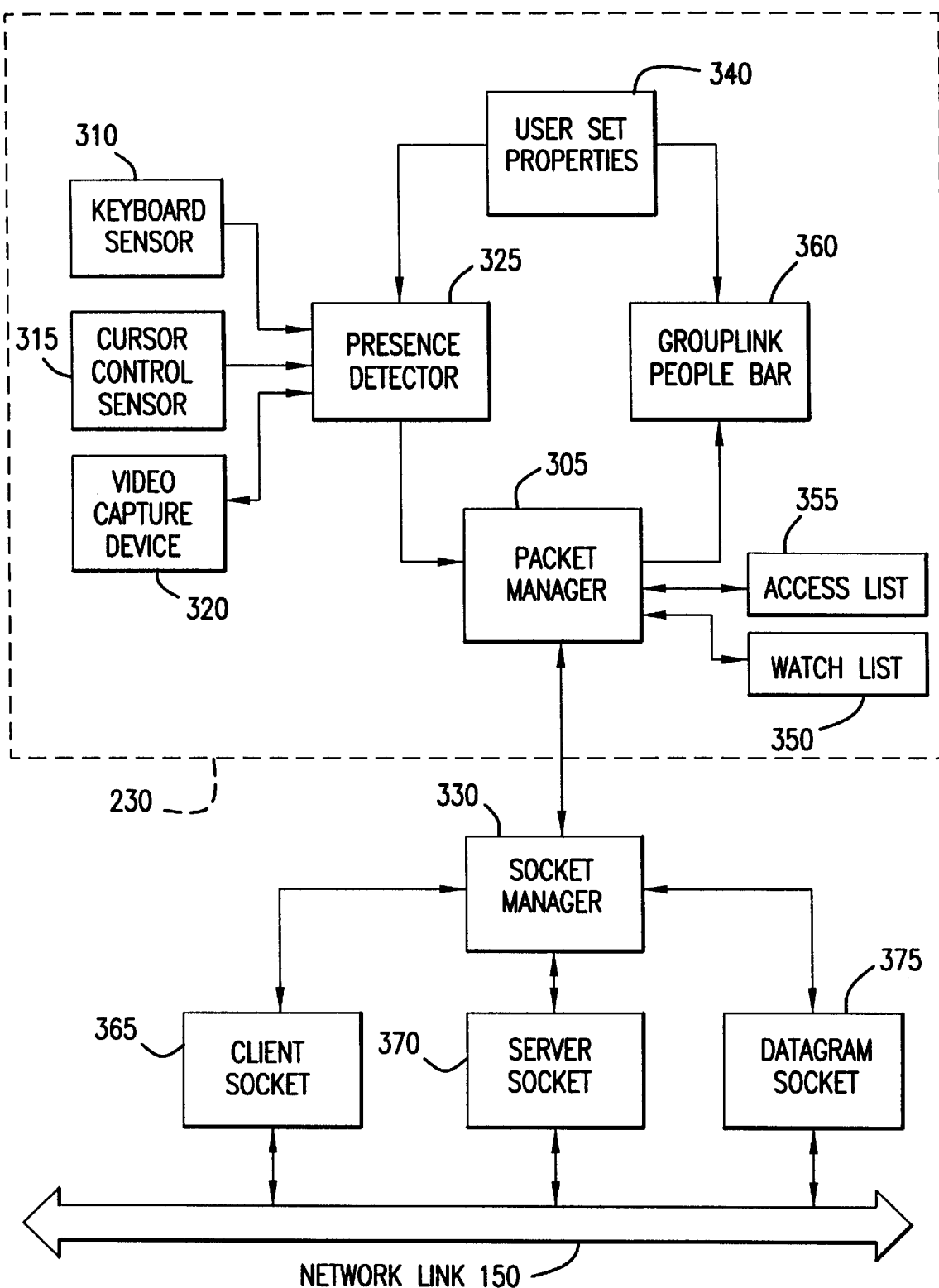
FIG. 3 is a block diagram illustrating the architecture of one embodiment of an end point system of the present invention.

FIG. 3 is a block diagram illustrating the architecture of one embodiment of the present invention. Two or more end point systems (each located at a different end point) can interact with one another by executing GroupLink application 230. With each of the multiple end point systems executing GroupLink application 230, the end point systems can communicate user proximity information to one another. The user proximity information indicates the proximity of the individual users to their respective end points. The proximity information transferred from an observee end point system to an observer end point system can be any of a wide range of information. For example, the proximity information may be a simple "IN" or "OUT" indication (identifying whether the user is IN or OUT of his office), a likelihood or probability that a user is IN or OUT, a video snapshot or video frame of the user when he is in close proximity to the end point, a video stream from a video camera pointed at the user's end point and coupled to the user's end point system, etc.

GroupLink application 230 includes a packet manager 305, a keyboard sensor 310, a cursor control sensor 315, a video capture device 320, a presence detector 325, coupled together as shown. GroupLink application 230 also includes user set properties 340, a GroupLink people bar 360, a watch list 350 and an access list 355. Packet manager 305 interacts with operating system 220 of end point system 110 as well as other components of GroupLink application 230. Also illustrated in FIG. 3 is a socket manager 330, client socket 365, server socket 370, datagram socket 375, and network link 150 coupled together as shown.

Watch list 350 is a data structure indicating all of the end points which end point system 110 is watching or observing (i.e., all end point systems from which end point system 110 receives proximity information). Access list 355 is a data structure indicating all of the end point systems which can receive proximity information from end point system 110. User set properties 340 is a set of properties which can be customized by the user of end point system 110. These options typically affect the type, nature, and timing of information provided to the observer end points, as discussed in more detail below.

GroupLink application 230 also includes keyboard sensor 310 and control sensor 315. Keyboard sensor 310 monitors the keyboard or other input device coupled to end point system 110 for user input. Similarly, cursor control sensor 315 monitors a cursor control device or other pointing device, such as a mouse or track ball which is coupled to end point system for user input.

GroupLink application 230 also includes a video capture device 320, which may include, for example, one or more video cameras, for capturing video frames and providing these captured video frames to presence detector 325 for processing. Video capture device 320 can be pointed at the end point to capture video frames of the end point. Video capture device 320 continuously captures video frames of the end point and provides the video frames to presence detector 325. For example, when the user is in close proximity to the end point (i.e., when the user is in his office), video capture device 320 captures video frames of the user in close proximity to the end point. When the user is not in close proximity, video capture device 320 continues to capture video frames of the end point (i.e., captures video frames of the empty office).

GroupLink application 230 also includes presence detector 325 for automatically and accurately detecting whether or not the user is in close proximity to the user's end point (i.e., detecting whether or not the user is present in his office) based on information provided from sensors 310 and 315 and video capture device 320 and other stored information. Presence detector 325 provides this detection information (proximity information) to packet manager 305. In one embodiment, presence detector 325 associates movement of a keyboard or a pointing device with the presence of the user at the end point. Even without activity from a keyboard or pointing device, presence detector 325 can detect the presence of the user at the end point based on video frames received from video capture device 320. Presence detector 325 can detect whether or not the user is in close proximity to his end point using a wide variety of techniques. Several embodiments of presence detector 325 are discussed in greater detail below in connection with FIGS. 5–9.

Packet manager 305 receives proximity information from presence detector 325 indicating whether or not the user is in close proximity to his end point. Packet manager 305 also receives messages from other end point systems via network link 150 and socket manager 330 indicating whether or not other users are in close proximity to their respective end points. When proximity information is received, packet manager 305 compares the source of each message to watch list 350. In one embodiment, this source is identified by a user identification in the message, such as by name. If the identified user is in watch list 350, then packet manager 305 provides an indication to the user of the end point, via GroupLink people bar 360, as to whether the identified user is in close proximity to his respective end point (i.e., an IN or OUT display on people bar 360). In one embodiment, proximity information is broadcast to other end point systems periodically. While in another embodiment, proximity information is broadcast to other end point systems only when the proximity information changes.

GroupLink application 230 includes GroupLink people bar 360. GroupLink people bar 360 provides a status display (i.e., IN or OUT for each user) of users being watched, based on watch list 350 and information received from other end point systems via packet manager 305. GroupLink people bar 360 receives from packet manager 305 proximity information updates regarding users being watched (i.e., updates as to whether each user being watched is IN or OUT).

A socket manager 330, client socket 365, server socket 370, and a datagram socket 375 are also illustrated in FIG. 3. In one embodiment, socket manager 330, client socket 365, server socket 370, and datagram socket 375 are part of network interface 250 of FIG. 2. Socket manager 330 manages the receipt and transmission of messages, in the form of packets, to and from other end point systems via network link 150. According to one embodiment, a packet is a message which includes proximity information, an identifier of the source of the message (i.e., the source end point system), and an identifier of the target of the message (i.e., the target end point system(s)). An initial message is transmitted via datagram socket 375 from a first end point system indicating that the first end point system is executing GroupLink application. The initial message is received at a plurality of other end point systems. Upon receipt of the initial message, the receiving end point system and the first end point system establish a connection for transferring proximity information via client socket 365 and server socket 370. Messages are transmitted from client socket 365 and received by server socket 370.

Figure 4:
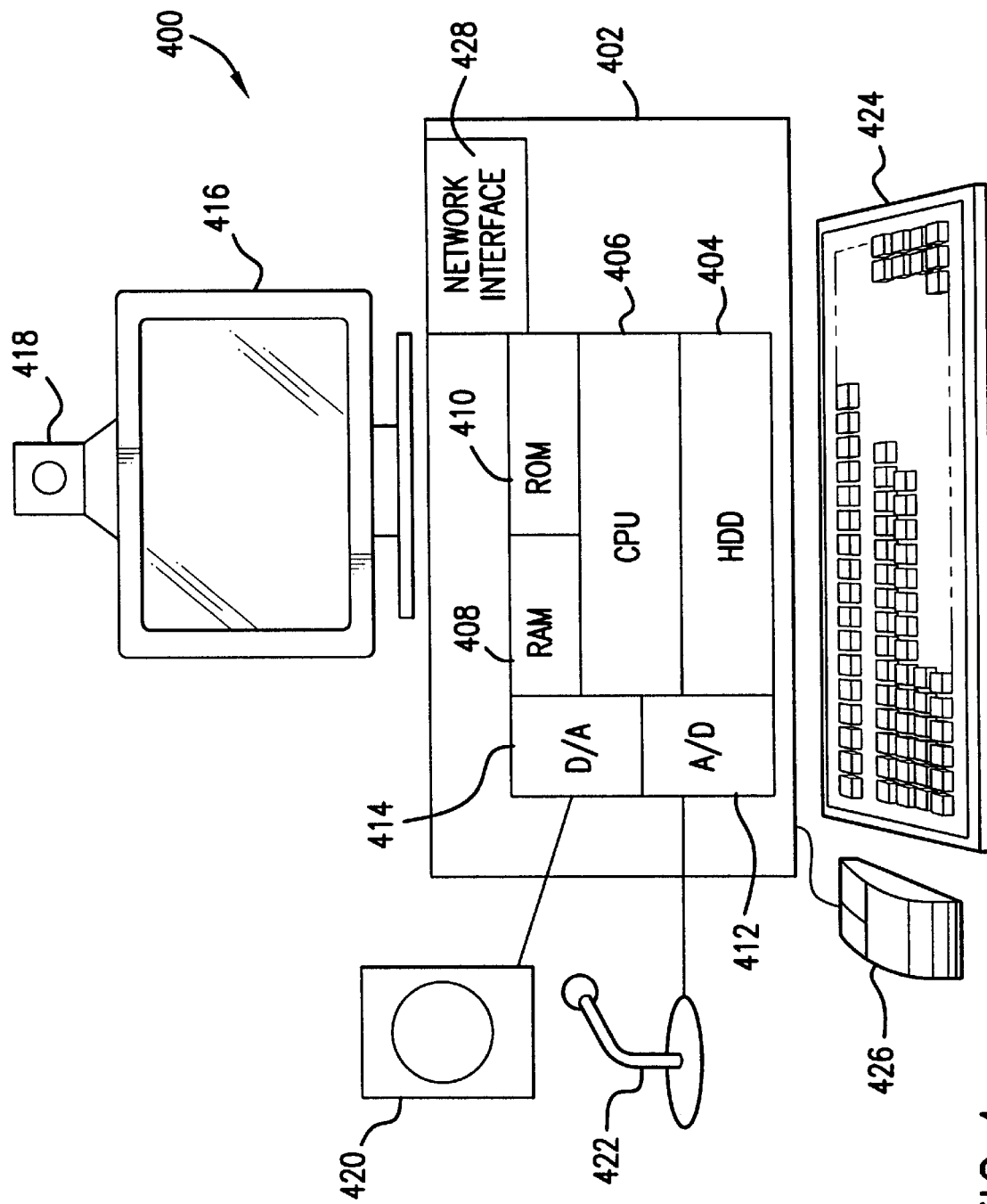
FIG. 4 is a block diagram of an embodiment of a computer system that may be used to implement an end point system of the present invention.

FIG. 4 illustrates a block diagram of an embodiment of a computer system for advantageously implementing end point system 110 of the present invention. Computer system 400 is a conventional computer system and includes a computer chassis 402 housing the internal processing and storage components, including a hard disk drive (HDD) 404 for storing software and other information, a central processing unit (CPU) 406 coupled to HDD 404, such as a Pentium® processor manufactured by Intel Corporation, for executing software and controlling overall operation of computer system 400. A random access memory (RAM) 408, a read only memory (ROM) 410, an analog-to-digital (A/D) converter 412 and a digital-to-analog (D/A) converter 414 are also coupled to CPU 406. Computer system 400 also includes several additional components coupled to CPU 400, including a monitor 416 for displaying text, graphics, icons and GroupLink people bar 360, a video camera 418, such as a ProShare® video camera available from Intel Corporation, for capturing video frames in the form, for example, of a bitmapped video image, a speaker 420 for outputting audio, a microphone 422 for inputting audio, a keyboard 424 and a mouse 426. Computer system 400 also includes a network interface 428 for connecting computer system 400 with network link 150. Network interface 428 may be any conventional interface, such as an Ethernet card for connecting to a local area network (LAN), a modem for connecting to the Internet, etc. Some of the components of computer system 400 can be coupled to one another in a conventional manner, such as through one or more busses, such as a data bus, an address bus and a control bus.

Referring to FIGS. 3 and 4, HDD 400 stores operating system 220, GroupLink application 230, applications 240, BIOS 210 and all or part of Network Interface 250. CPU 406 executes GroupLink application 230 to detect whether or not the user is in close proximity to his end point. Keyboard sensor 310 is coupled to keyboard 424 for receiving signals that indicate when one or more keys on keyboard 424 have been pressed. Cursor control sensor 315 is coupled to mouse 426 for receiving signals indicating that mouse 426 has been moved or clicked.

Video camera 418 is one embodiment of video capture device 320 (FIG. 3). However, other video capture devices can be used. Video camera 418 is positioned to view an end point that will be monitored by presence detector 325. In one embodiment, video camera 418 is positioned on top of monitor 416 and pointed at the user's work space normally occupied by the user when the user is working at computer system 400. In other words, in one embodiment, video camera 418 is positioned and pointed to provide video signals of the user when the user is working in his office (i.e., when the user is in close proximity to his end point). Camera 418 may be placed in other positions to provide video of the user when the user is in close proximity to his end point.

Figure 5:
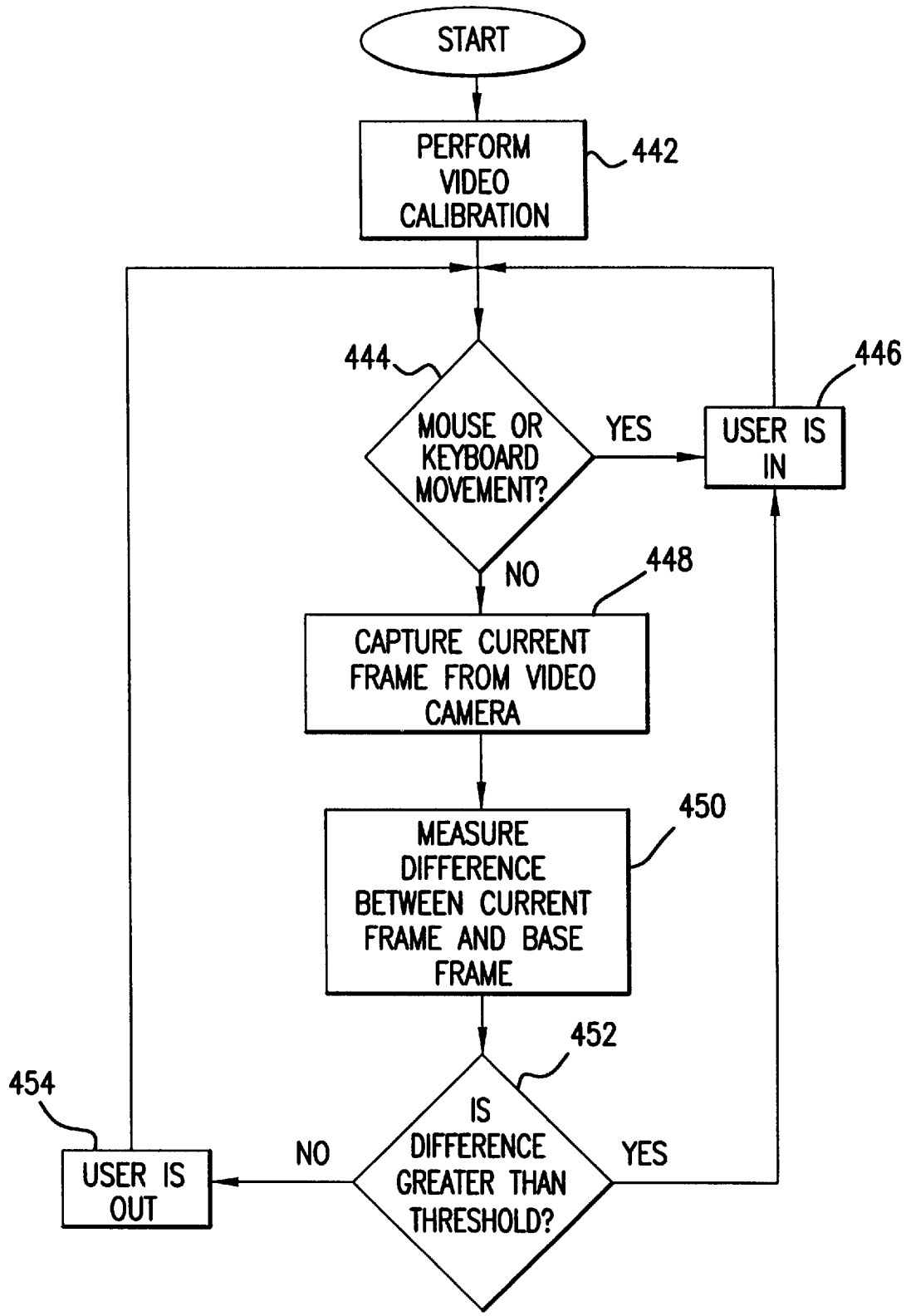
FIG. 5 is a flow chart of the main program operation of a presence detector according to an embodiment of the present invention.

Referring to FIGS. 5–9, the operation of presence detector 325 will now be described. FIG. 5 is a flow chart of the main program operation of presence detector 325 according to an embodiment of the present invention. At step 442, presence detector 325 performs video calibration on end point system 110. Video calibration involves capturing and storing a base frame of the end point to be used as a base or reference point by presence detector 325 for detecting whether or not the user is currently in close proximity to the end point. The base frame, in one embodiment, is taken while the user is not in close proximity to the end point (i.e., taken while the user is not in his office and therefore out of view of video camera 418). Additional embodiments of the step of video calibration, step 442, are described in greater detail below in connection with FIG. 6.

After system 110 has been calibrated, presence detector 325 determines whether there is movement of mouse 426 or keyboard 424 based on the signals provided from keyboard sensor 310 and cursor control sensor 315, step 444. Information from other non-video sensors in the user's office (not shown) may also be used to conclude that the user is in close proximity to the end point, such as a weight sensor located in the user's chair (not shown), operation of a dictaphone, etc. In one embodiment, any mouse or keyboard movement is interpreted by presence detector 325 to mean that the user is in close proximity to the end point (i.e., the user is IN), step 446. Alternatively, presence detector 325 could ignore any mouse and keyboard movement and detect whether or not the user is in close proximity to the end point based only on video frames provided by video capture device 320.

In step 448, presence detector 325 receives and captures a current video frame of the end point from video capture device 320 if there is no mouse or keyboard movement detected. The current video frame of the end point is captured in step 448 because a user could be in close proximity to the end point without using keyboard 424 or mouse 426.

After presence detector 325 receives and captures the current video frame (step 448), presence detector 325 compares the current video frame to the base video frame. In one embodiment (shown as step 450 in FIG. 5), presence detector 325 compares the current video frame to the base video frame by measuring the difference between the current video frame and the base video frame. The current video frame represents the current situation or status of the end point (i.e., a current video frame of the user's office). The base video frame provides a base or reference point which was captured, in one embodiment, when the user was not in close proximity to the end point. Therefore, measuring the difference between the current frame to the base frame (step 450) provides a measurement of the relative current status of the end point as compared to the base frame. Other embodiments of step 450 are described in detail below in connection with FIG. 8.

After presence detector 325 compares the current video frame to the base video frame, presence detector makes a decision as to whether or not the user is in close proximity to the end point based on the comparison. In one embodiment (shown as step 452 in FIG. 5), presence detector 325 compares the difference measurement calculated in step 450 to a threshold value, which is stored in a memory, such as HDD 404. If the difference measurement is greater than the threshold, presence detector 325 determines or concludes that the user is in close proximity to the end point (i.e., the user is IN), step 446. If the difference measurement is less than or equal to the threshold, then presence detector 325 determines that the user is not in close proximity to the end point (i.e., the user is OUT of his office), step 454.

In an alternative embodiment, video camera 418 comprises a plurality of video cameras, wherein each camera is positioned at a different position and provides a slightly different view of the end point. When multiple cameras are used, the steps of FIG. 5 can be performed in parallel for all cameras. For example, each camera is separately calibrated and generates its own masked base frame based on its respective view of the end point (step 442), captures its own respective current frame (step 448), and measures the difference between its current frame and its respective base frame. Presence detector can be programmed to determine that the user is IN when any number (one, some, a majority, or all) of the cameras provide a difference measurement that is greater than the threshold value. For example, presence detector 325 can conclude that the user is in close proximity to the end point if one or more of the cameras provide difference measurements greater than the threshold value, or only if all cameras provide difference measurements greater than the threshold. Numerous possibilities exist for interpreting the data provided from a plurality of cameras to accurately determine when a user is in close proximity to an end point.

Presence detector 325 provides proximity information to packet manager 305 indicating whether or not the user is in close proximity to the end point. In one embodiment, after presence detector 325 determines that the user is in close proximity to the end point (step 446), or after presence detector 325 determines that the user is not in close proximity to the end point (step 454), presence detector 325 provides updated proximity information to packet manager 305.

In one embodiment, each video frame output by video capture device 320 (i.e., video camera 418) may comprise, for example, a bitmapped image of 120 rows by 160 columns of picture elements (pixels). The video frame bitmap may include, for example, a red value, a green value and a blue value (RGB values) for each pixel of the video frame. Each of the red, green and blue (RGB) values may be identified by a multi bit value, such as a byte. With, for example, a byte for each RGB value, each RGB value can designate 1 of 256 possible reds, 1 of 256 possible greens or 1 of 256 possible blues. All three RGB values together for a pixel (24 bits) identify the color for the pixel. Alternatively, the video frame bitmap may comprise a color value and an intensity value for each pixel. Other pixel identifications are possible.

Figure 6:
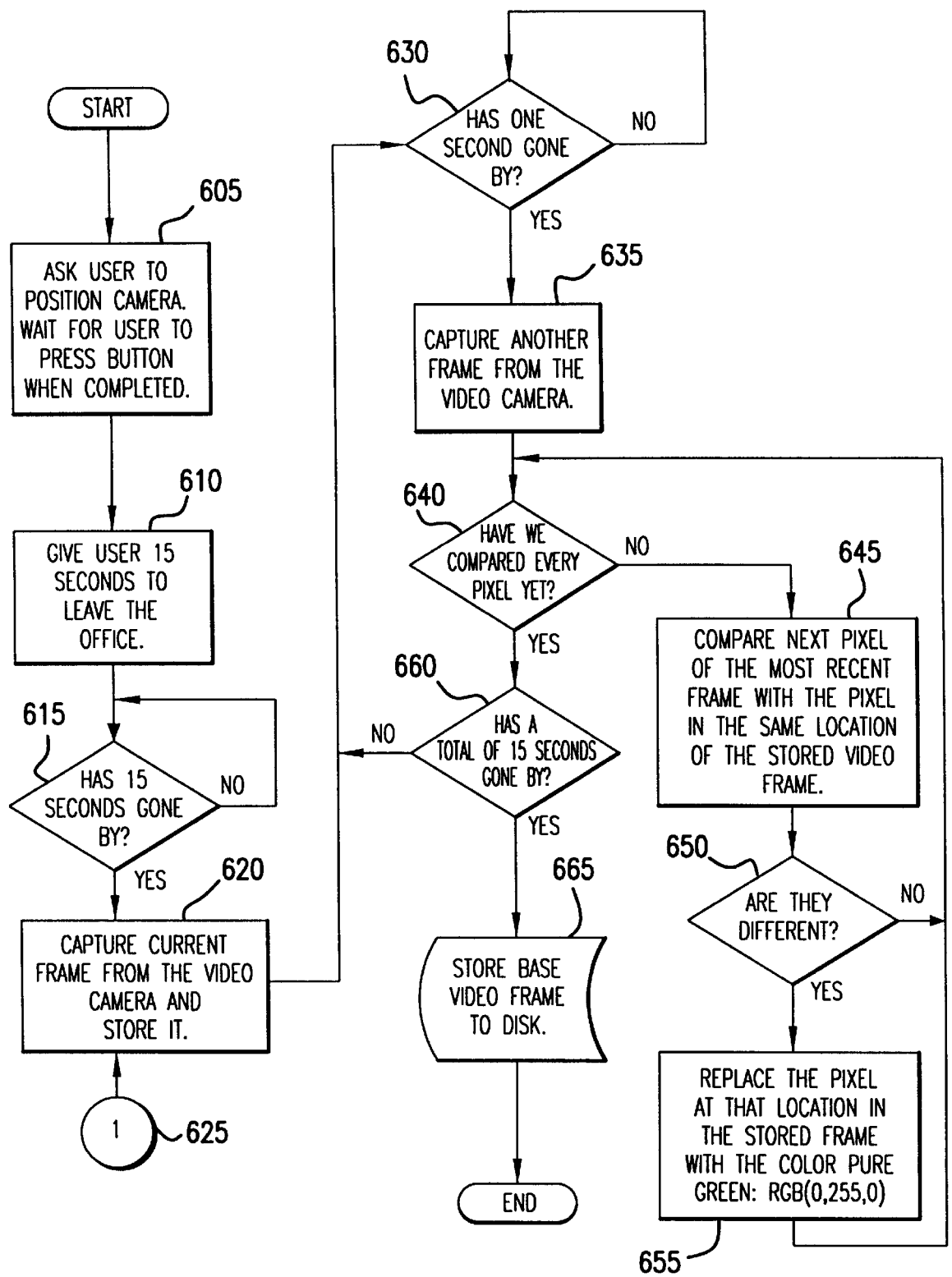
FIG. 6 is a flow chart of the steps followed for video calibration according to an embodiment of the present invention.

FIG. 6 is a flow chart of the steps followed for video calibration (step 442, FIG. 5) according to an embodiment of the present invention. In step 605, presence detector 325 provides a message (for example, via monitor 416) asking the user to position video camera 418 to point at the user when he is seated in his office chair or his normal working position. Camera 418 should be pointed to capture the user's face and at least part of the user's body when the user is seated at his office chair. The best position for camera 418 is typically on top of monitor 416. In an alternative embodiment, camera 418 may be pointed to capture substantially the entire end point (i.e., substantially all of the user and the user's office space). Regardless how much of the user and user's office space is captured by video camera 418, video camera 418 may comprise a plurality of video cameras, wherein each video camera can be located in a different position and pointed to capture a slightly different view of the end point (i.e., user's office space). When camera 418 is properly positioned, the user presses a predefined button.

In steps 610 and 615, presence detector 325 waits a period of time (such as 15 seconds) after the button is pressed to allow the user to move to a position where he is not in close proximity to the end point (i.e., to leave the office or at least move to a position where he is not within the view of camera 418).

After presence detector has waited the period of time (i.e., 15 seconds), presence detector 325 captures and stores the current video frame of the end point, step 620. This current (first) video frame is our initial base frame and is captured while the user is not in close proximity to the end point. After one second has passed (step 630), presence detector 325 captures a second video frame of the end point, step 635.

In step 640, presence detector 325 checks whether every pixel has been compared yet. Initially, no pixels have been compared and the flow proceeds to step 645. In step 645, presence detector 325 compares the first pixel of the second frame to the first pixel of the first frame.

At step 650, presence detector 325 determines whether the first pixels of the first and second frames are the same (i.e., whether the RGB values of the first pixels of the two frames are the same).

In step 655, if the two pixels are different, then presence detector 325 replaces the first pixel in the first frame with a predetermined masking color. The masking color should be a color which is unlikely to be in close proximity to the end point, such as pure green: RGB (0,255,0). In other words, colors which are present in the user's office or colors which are present on the user (his hair and skin color, or colors of his clothing) should not be used as the masking color. Other colors, however, can be used as the masking color. The same masking color should be used for all bits that are determined to be different. If in step 650 presence detector 325 determines that the two pixels are the same, then the base frame pixel is not replaced.

Next, the flow proceeds back to step 640 to check whether all pixels have been compared. Because all pixels have not yet been compared, the flow proceeds to step 645 where the second pixel of the second frame is compared to the second pixel of the first frame. If the second pixels are different, the second pixel is replaced with the masking color, step 655. If the second pixels are the same, the pixel is not replaced.

Next, the flow proceeds to step 640 and then to step 645, where the third pixels of the two frames are compared. This process of comparing corresponding pixels of the first and second frames continues until all pixels in the two frames have been compared (see step 640). During this process, if a pixel in the first frame is different from the corresponding pixel in the second frame, the pixel in the first (initial base) frame is replaced with the masking color. If the corresponding pixels of the two frames are the same, no replacement is made.

When all pixels in the first frame have been compared to the corresponding pixels in the second frame, the flow proceeds to step 660 where presence detector 325 checks whether 15 seconds has passed since the first video frame was captured. Other time limits may be alternatively used. If the 15 second time limit has not passed, then the flow proceeds to step 630 to check whether one second has passed since the last video frame was captured. This ensures that one frame is captured every second. Video frames may be captured at a different rate. After one second has passed, a third video frame is captured and stored, step 635.

The flow then proceeds to the loop formed by steps 640, 645, 650, 655 and back to 640. This loop compares each pixel in the first (initial base) frame with the corresponding pixels in the third frame, and replaces the pixels in the first frame with the masking color for those pixels which are different.

This process is repeated for each of the subsequent frames captured during the 15 second time limit (i.e., for each of the 15 captured video frames). The result is that presence detector 325 masks out natural motion from the first video frame (initial base frame) using, in one embodiment, the steps illustrated in FIG. 6 to generate a masked base frame, which is stored in memory, step 665. The natural motion that is masked from the first video frame includes the motion (unrelated to the user) that naturally occurs within close proximity of the end point (i.e., motion within view of video camera 418 when the user is OUT of the office or at least when the user is out of the view of camera 418). Examples of natural motion include an analog clock with hands that move, a digital clock with digits that change, a television or second computer monitor with a changing screen (such as a screen saver), an open doorway with people walking back and forth, a window with moving trees or cars in the background, or changing sunlight, etc. All of these types of natural motion, if within the view of camera 418, should be masked out from the base frame because this natural motion (if not masked out) will erroneously affect the presence detector's determination as to whether the user is in close proximity to the end point. While the first video frame (initial base frame) may be compared to only one subsequent video frame to identify the pixels corresponding to natural motion, it is advantageous to compare the first (initial base) frame to each frame in a group of frames captured over a period of time when the user is not in close proximity to the end point.

Figure 7:
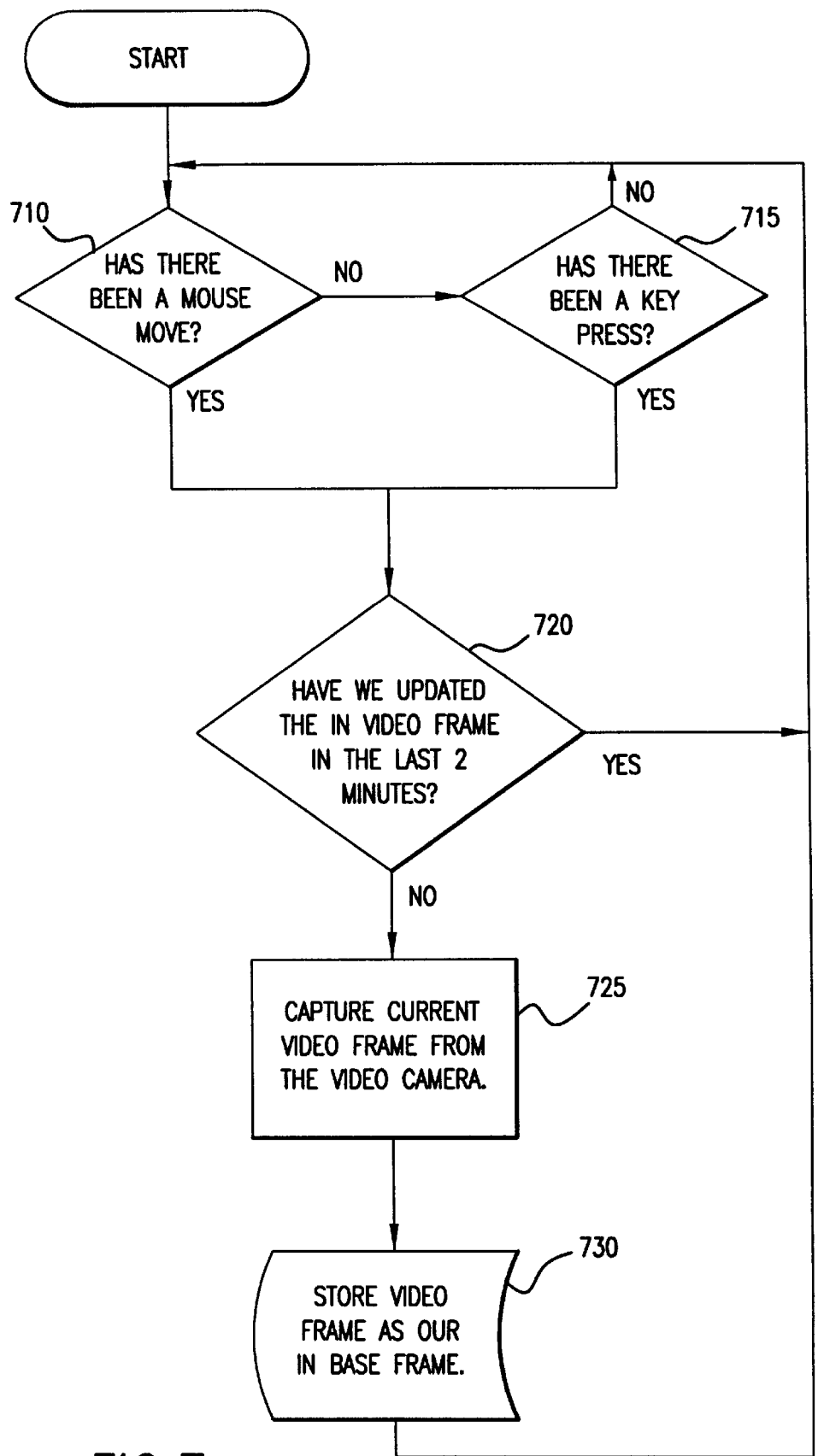
FIG. 7 is a flow chart of the steps followed for updating the IN video frame according to an embodiment of the present invention.

FIG. 7 is a flow chart of the steps followed for updating the IN video frame according to an embodiment of the present invention. In one embodiment, presence detector 325 continuously maintains the most recent IN frame in memory. The IN frame is a video frame of the end point when presence detector 325 knows that the user is in close proximity to the end point (i.e., the user is IN). In one embodiment, the IN frame is captured only in response to mouse 426 or keyboard 424 movement, because presence detector 325 assumes that the user is IN if there is movement from the mouse 426 or keyboard 424.

In steps 710 and 715, presence detector 325 detects whether there has been mouse 426 or keyboard 424 movement. If there has been mouse or keyboard movement, then presence detector determines whether or not the IN frame has been updated in the last two minutes, step 720. The IN frame can be updated more or less frequently. If the IN video frame has not been updated in the last two minutes, presence detector 325 captures the current video frame and stores the video frame as the IN frame. If the IN frame has been updated in the last two minutes, then the flow proceeds back to steps 710 and 715 to detect mouse and keyboard movement. The steps of FIG. 7 can be continuously executed by presence detector 325 to allow presence detector 325 to maintain an updated IN frame in memory.

Figure 8:
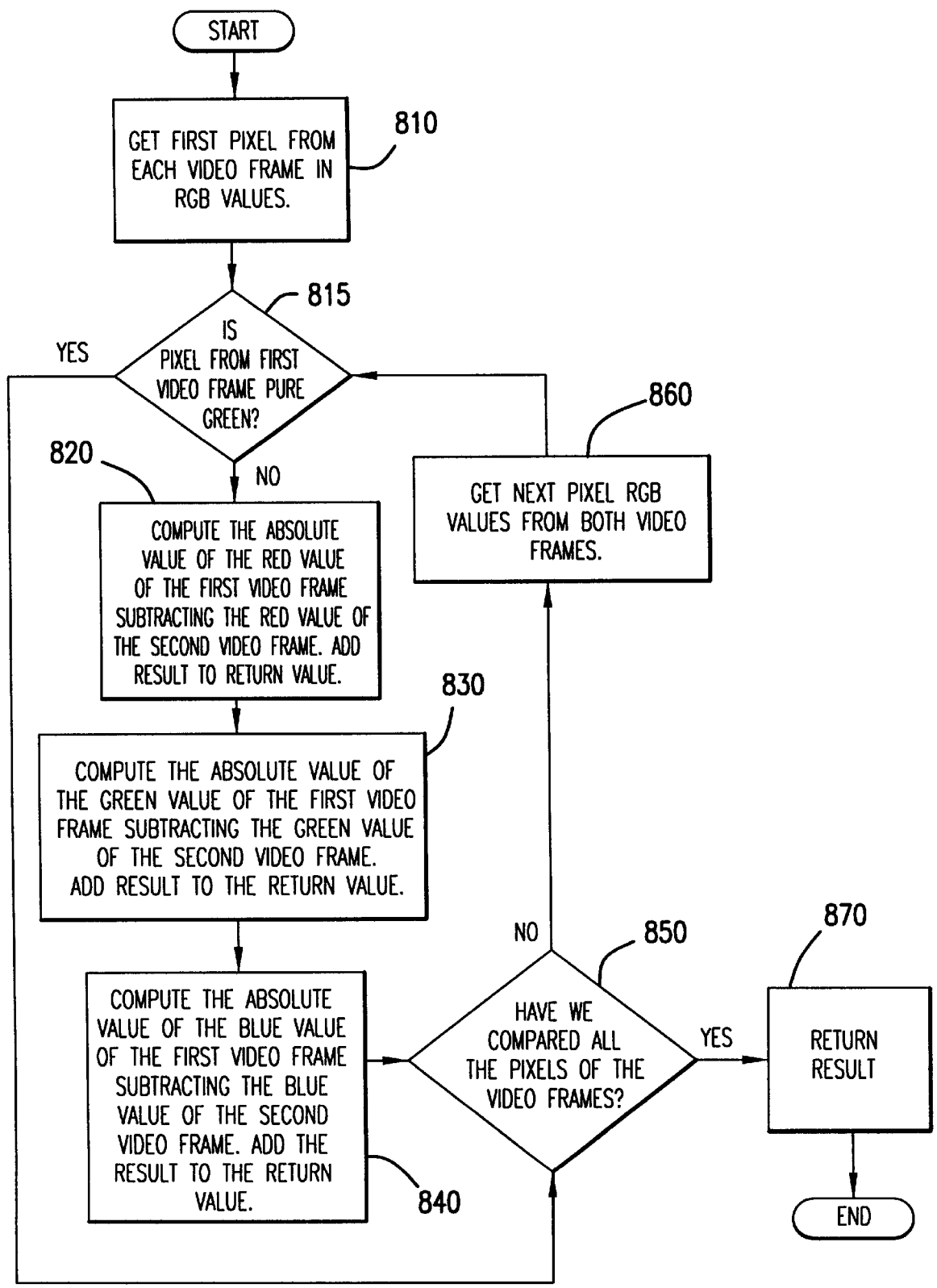
FIG. 8 is a flow chart of the steps followed for measuring the difference between two video frames according to an embodiment of the present invention.

FIG. 8 illustrates a flow chart of the steps followed for measuring the difference between two video frames (such as step 450, FIG. 5) according to an embodiment of the present invention. At step 810, presence detector 325 obtains the RGB values of the first pixel for both a first video frame (video frame A) and a second video frame (video frame B) which are being differenced. Each RGB value can comprise, for example, a byte (i.e., a byte for the red value, a byte for the green value, and a byte for the blue value of the pixel).

In step 815, presence detector 325 determines whether the pixel of video frame A is a masked bit (i.e., pure green). If the bit is pure green, then the difference measurement of steps 820, 830 and 840 will not be performed for this pixel, and the flow proceeds to step 850. At step 850, presence detector 325 determines whether all pixels of the video frames have been compared. If all pixels have not been compared, the flow proceeds to step 860 where presence detector 325 obtains the next pixel for both video frames.

Step 815 is then repeated to determine whether this pixel of video frame A has been masked out (i.e., pure green). If the pixel in video frame A is not pure green, then the flow proceeds to step 820. Step 815 ensures that the pixels which have been masked out will not contribute to the difference measurement.

In some instances, there may not be any masked out pixels, or it may be unnecessary or undesirable to ignore the masked out pixels (if any) during a difference measurement. In such cases, step 815 could be skipped.

In step 820, presence detector 325 calculates the absolute value of the difference between the two red values of corresponding pixels. The absolute value of the difference of red values of corresponding pixels (pixel i) between frame A and frame B, for example, may be calculated as follows: absolute value [Redvalue (pixel i)$_{frame\ A}$−Redvalue(pixel i)$_{frame\ B}$]. For the first pass through step 820, i=1(the first pixel). This absolute value for this pixel is added to the return value, which will be used as a running total of the sum of absolute values of the differences for red, green and blue values.

In step 830, presence detector 325 calculates the absolute value of the difference between the two green values of corresponding pixels, which may be calculated as follows: absolute value [Greenvalue (pixel i)$_{frame\ A}$−Greenvalue (pixel i)$_{frame\ B}$]. For the first pass through step 830, i=1(the first pixel). This absolute value for this pixel is added to the return value, which includes a running total of the sum of absolute values for red, green and blue values.

In step 840, presence detector 325 calculates the absolute value of the difference between the two blue values of corresponding pixels, which may be calculated as follows: absolute value [Bluevalue (pixel i)$_{frame\ A}$−Bluevalue(pixel i)$_{frame\ B}$]. For the first pass through step 840, i=1(the first pixel). This absolute value for this pixel is added to the return value.

In step 850, presence detector 325 determines whether all pixels in the video frame have been compared. If all pixels have not yet been compared, the flow proceeds to steps 860 where presence detector 325 retrieves the next pixel for both frame A and frame B (the two frames being differenced). In other words the variable i is incremented by 1 to indicate the next pixel. The steps 820, 830 and 840 are then repeated, adding the absolute values for each color for this pixel to the return value, but only for those pixels in frame A which are not masked out (i.e., only for pixels which are not pure green). Step 815 determines whether steps 820, 830 and 840 will be performed for the pixel.

This process, shown as the loop from steps 820, 830, 840, 850 and 860, is repeated until the absolute values of the differences is calculated for all pixels of the video frame (except the masked out pixels), adding all of the absolute values to the return value. When the process of FIG. 8 is completed, the return value will contain the difference measurement for the two frames being differenced (frame A and frame B). The masked out pixels, however, do not contribute to the difference measurement.

In one embodiment, the difference measurement is divided by the number of pixels in a video frame to generate a normalized difference measurement. In such case, the return value would contain the normalized difference measurement.

Referring to FIGS. 5 and 8, step 450 may be performed, for example, by performing the steps of FIG. 8 to calculate the normalized difference measurement (or the difference measurement) for the current frame and the base frame.

Although not required, it is advantageous for step 450 to calculate the difference measurement using the current frame and the masked base frame. This can be calculated as: absolute value [Redvalue (pixel i)$_{current\ frame}$–Redvalue (pixel i)$_{masked\ base\ frame}$]+absolute value [Greenvalue (pixel i)$_{current\ frame}$–Greenvalue(pixel i)$_{masked\ base\ frame}$]+absolute value [Bluevalue (pixel i)$_{current\ frame}$–Bluevalue(pixel i)$_{masked\ base\ frame}$], for all pixels in the masked base frame (i=1 to N) except for the masked out pixels (i.e., except for those pixels in the masked base frame having the masking color, such as pure green). Therefore, presence detector 325 first detects whether each pixel in the masked base frame has the masking color, step 815. If the pixel has the masking color, the absolute values are not calculated for that pixel. As a result, in one embodiment, the pixels which varied due to natural motion and which were masked out will not affect or contribute to the difference measurement.

Referring again to FIG. 5, Step 452 involves comparing the difference measurement (or a normalized difference measurement) to a threshold value. A normalized difference measurement of, for example, 600 H indicates relatively little difference between the current video frame and the masked base frame, and indicates that it is very likely that the user is not in close proximity to the end point. On the other hand, a normalized difference measurement of 2800 H indicates that it is extremely likely that the user is in close proximity to the end point. The threshold value can be adjusted by the user using a sliding scale via the user set properties 340. The threshold value can be set by the user to be, is for example, 3000 H. If a large number of pixels in the base frame are masked out due to natural motion, the threshold value will usually need to be decreased by the user to prevent presence detector 325 from incorrectly concluding that the user is OUT of the office, when in fact the user is IN the office. This can be determined by the user through experimentation. Alternatively, rather than providing a binary indication that the user is IN or OUT, presence detector 325 may provide an indication in terms of likelihood or probability (i.e., 80% probability that the user is IN the office).

In addition, if a bitmapped video frame provides data in a format other than one byte per RGB value (24 bits total per pixel), then the RGB values provided can be advantageously converted by presence detector 325 to a specific color, and then the color can be converted to the eight bit RGB values (24 bits total per pixel). This ensures that the user adjusted threshold value will work for video frames having different formats.

There are several different ways in which presence detector 325 can measure a difference between the current frame and the masked base video frame, steps 450 and 452. Rather than calculating the difference measurement as the sum of the absolute values of the differences and comparing this difference measurement to a threshold value, presence detector 325 may compare the colors of the current frame to the colors of the masked base frame. This could be performed as follows. First, all of the colors for the current frame would be identified, even those corresponding to masked out pixels in the base frame. Alternatively, the pixels in the current frame corresponding to the masked out pixels could be ignored. Next, all of the colors in the masked base frame would be identified, except the masked out pixels. Then, the two lists of colors would be compared to identify the colors that are present in the current frame and not present in the base frame, and to identify the colors present in the base frame and not present in the current frame. Presence detector 325 would then determine whether the user is in close proximity to the end point based on the comparison of the two lists of colors. For example, the color of the user's eyes, skin and hair may be present only in the current frame, and missing from the base frame. As a result, if presence detector 325 is aware that these colors are associated only with the user, presence detector 325 can determine when the user is in close proximity to the end point based on the existence of these colors in the current video frame, or the increased frequency of these colors in the current frame as compared to the base frame. In this alternative embodiment, the process of color identification and comparison would replace the steps of 450 and 452 in FIG. 5.

Figure 9:
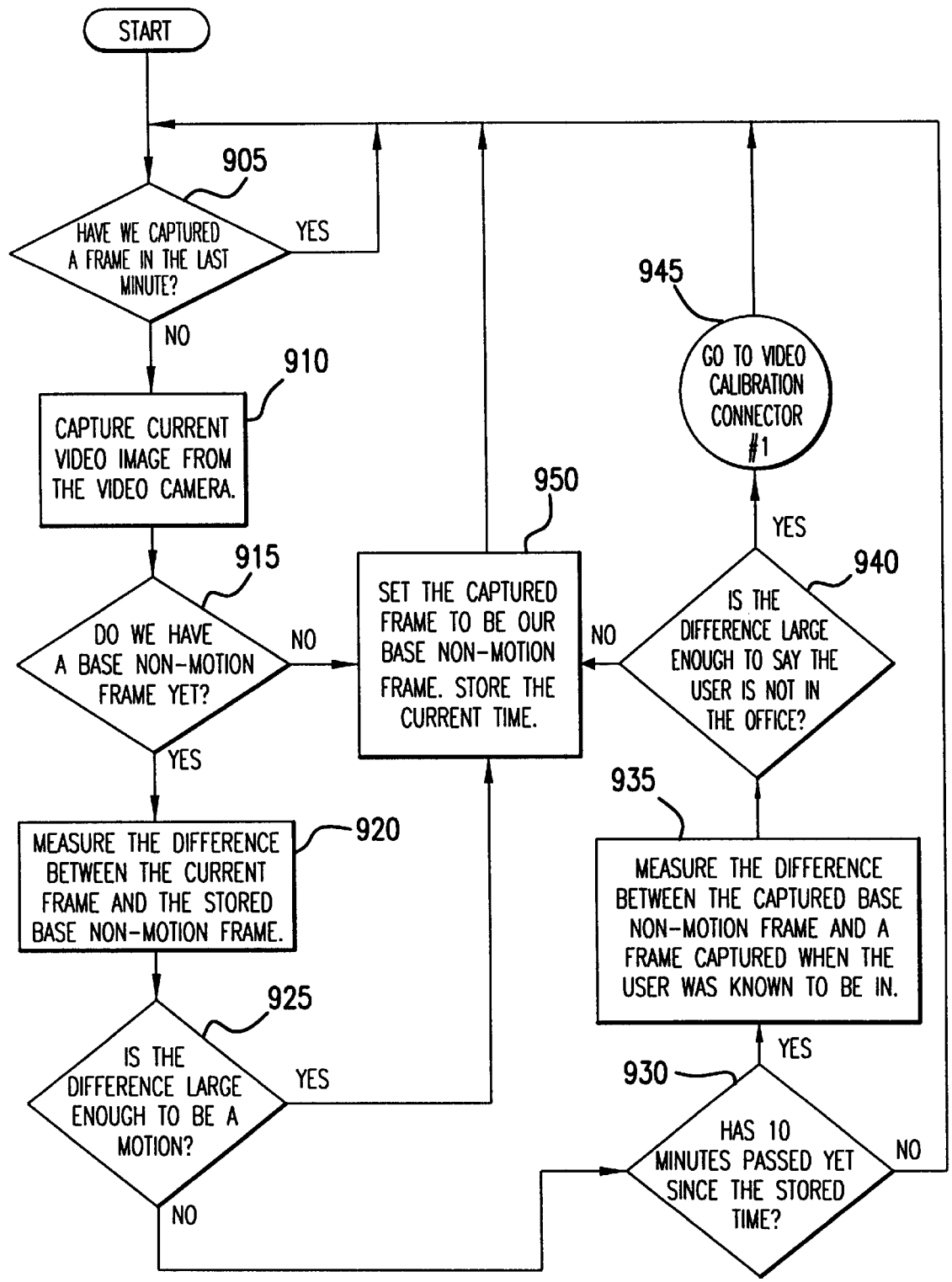
FIG. 9 is a flow chart of the steps followed for determining whether the base video frame is erroneous and should be updated according to an embodiment of the present invention.

FIG. 9 illustrates a flow chart of the steps followed for determining whether the base video frame is erroneous and should be updated. If there is no mouse or keyboard movement and if presence detector 325 concludes that the user is in close proximity to the end point (i.e., if the result of step 452 is YES), then the presence detector 325 performs the steps of FIG. 9 to determine whether the base frame is erroneous and should be updated. The steps of FIG. 9 can be necessary because video camera 418 may have moved, a piece of furniture at the end point may have moved, the sun may have set, etc. Any of these situations can cause the calculated difference measurement to incorrectly read as a large value due to the moved chair, moved camera, etc. An erroneously large difference measurement will cause presence detector 325 to erroneously indicate that the user is in close proximity to the end point when in fact the user may not be in close proximity to the end point. A solution to this problem is to update the base video frame to reflect the new position of the camera, the new position of the chair, the sunset, etc. By using the steps of FIG. 9, presence detector 325 of the present invention adapts to changes at the end point and advantageously ensures that the base frame is always accurate. The steps of several of the Figs. disclosed herein, including the steps of FIGS. 5, 7 and 9, can be performed in parallel by presence detector 325 when required.

Referring to FIG. 9, in step 905, it is determined whether a frame has been captured in the last minute. If not, then the current video frame is captured, step 910. Otherwise, presence detector 325 waits one minute before capturing a video frame, steps 905, 910.

In step 915, presence detector determines whether we have a base non-motion frame yet. Initially, we do not have a base non-motion frame, and the captured frame is set to be the base non-motion frame, step 950.

The base non-motion frame, for example, can be a frame captured (i.e., stored in memory) when there was no mouse or keyboard movement and presence detector 325 determined (correctly or incorrectly) that the user is in close proximity to the end point. The current frame can be used as the base non-motion frame because the steps of FIG. 9 will be performed only when there is no mouse or keyboard motion and presence detector 325 concludes (correctly or incorrectly) that the user is in close proximity to the end point.

Once the current frame is set to be the base non-motion frame, step 950, the flow proceeds back to steps 905 and 910, where a new current frame is captured after one minute. At step 915, because we have a base non-motion frame, the flow proceeds to step 920.

At step 920, presence detector 325 measures the difference between the new current frame and the base non-motion frame. The difference measurement calculated in step 920 may be performed using any of the techniques described in connection with FIG. 8. For step 920, it is not necessary to mask out or ignore any pixels. It can, however, be advantageous to ignore pixels previously associated with natural motion for step 920.

In step 925, presence detector 325 determines whether the difference measurement is sufficient to indicate motion. Step 925 can involve comparing the difference measurement to a second threshold value. The second threshold value is not necessarily the same as the threshold value used in connection with step 452. A relatively large difference measurement at steps 920 and 925 likely indicates that the user is moving at the end point, which confirms that presence detector 325 was correct in concluding that the user is in close proximity to the end point. In such a case, there is no need to update the base video frame, and the flow proceeds back to step 950, where the new current frame is set to be the base non-motion frame, and the process continues checking for motion at the end point by repeating steps 905, 910, 915, 920 and 925 using a new captured frame.

If the difference measurement calculated in step 920 is insufficient to indicate motion (i.e., if the difference measurement is less than the second threshold value), then the flow proceeds to step 930. In step 930, presence detector 325 determines whether ten minutes has passed since the base non-motion frame was set (step 950). If ten minutes has not elapsed, the flow proceeds to step 905, and then to steps 910, 915, 920 and 925. By checking whether ten minutes has elapsed, the steps of FIG. 9 are comparing each of ten consecutive video frames (one per minute over ten minutes) to the base non-motion frame to determine there is motion at any of the ten frames, as compared to the base non-motion frame. If there is motion, then this indicates that the presence detector 325 correctly concluded that the user is in close proximity and the base frame is accurate and need not be updated.

At the end of ten minutes, if none of the ten frames indicated motion at the end point then the flow proceeds to step 935. If none of the ten frames (as compared to the base non-motion frame) indicated motion at the end point (as measured, for example, by the difference measurement), then this indicates that the user probably is not in close proximity to the end point and thus, the base frame should be updated.

At step 935, presence detector 325 double checks whether the base frame is erroneous by measuring the difference between the base non-motion frame and the last known IN frame. The last known IN frame is the last known video frame when the mouse or keyboard moved, and may be captured, for example, using the steps of FIG. 7. The difference calculation of step 935 may mask out pixels previously known to be associated with natural motion.

At step 940, presence detector 325 determines whether the difference measurement calculated in step 935 is sufficiently small to indicate that the user is in close proximity to the end point. If the difference measurement calculated at step 935 is smaller than a third threshold value (which may be different from the other threshold values), this indicates that the current frame (the base non-motion frame) strongly resembles the last known IN frame, and thus, it is very likely that the user is presently in close proximity to the end point, and the flow proceeds to step 950. This confirms that the presence detector was correct in concluding that the user is IN, and thus it is not necessary to update the base frame.

If the difference between the base non-motion frame (current frame) and the last known IN frame calculated at step 935 is greater than the third threshold value, then this indicates that the user is likely not in close proximity to the end point and the base frame is erroneous and should be updated. Accordingly, the flow then proceeds to step 945, where it jumps to step 625 for video calibration (FIG. 6) where the base frame is updated. In an alternative embodiment, prior to jumping to step 625 to update the base frame, presence detector 325 can display on monitor 416 a message and/or an audio prompt via speaker 420 asking whether the user is in his office/or whether he would like to cancel the updating of the base frame. If the user is in his office, the base frame may not need updating and the user can cancel the updating process by, for example, pressing a predetermined key on keyboard 424.

The embodiments of the present invention have a wide variety of applications. For example, presence detector 325 may be coupled to a user's compact disc (CD) player for automatically turning off and on the CD player when the user is OUT or IN, respectively. Presence detector 325 may similarly be used to automatically control the lights in the user's office, to automatically log the user in and out from a computer network, or to notify a home owner at his office when his garage door at home has been opened.

The above describes particular embodiments of the present invention as defined in the claims set forth below. The invention embraces all alternatives, modifications and variations that fall within the letter and spirit of the claims, as well as all equivalents of the claimed subject matter. For example, all threshold values described herein may be set to the same value or they may be separately adjustable by the user via user set properties 340. Instead of using one video camera to detect presence of a user, a plurality of video cameras can be used.

What is claimed is:

1. A method of detecting whether a user is in close proximity to an end point regardless whether the user is moving comprising the steps of:

capturing a base video frame of the end point when the user is not in close proximity to the end point;

capturing a current video frame of the end point;

comparing the current video frame of the end point to the base video frame of the end point; and determining whether the user is currently in close proximity to the end point based on said step of comparing.

2. A method of detecting whether a user is in close proximity to an end point regardless whether the user is moving comprising the steps of:

capturing a base video frame of the end point when the user is not in close proximity to the end point;

masking out natural motion from the base video frame to generate a masked base video frame;

capturing a current video frame of the end point;

comparing the current video frame of the end point to the masked base video frame of the end point;

determining whether the user is currently in close proximity to the end point based on said step of comparing.

3. The method of claim 2 wherein said step of masking out natural motion comprises the steps of:

capturing a group of video frames of the end point over a period of time when the user is not in close proximity to the end point;

comparing portions of each captured video frame of the group to corresponding portions of at least one other captured video frame of the group;

identifying video frame portions, if any, which vary within the group based on said step of comparing portions; and masking out the identified video frame portions from the base video frame to generate a masked base video frame.

4. The method of claim 2 wherein said step of masking out natural motion comprises the steps of:

capturing a group of video frames of the end point over a period of time when the user is not in close proximity to the end point;

comparing each pixel of each captured video frame of the group to corresponding pixels of at least one other captured video frame of the group;

identifying pixels, if any, which vary within the group based on said step of comparing each pixel; and masking out pixels in the base video frame corresponding to the identified pixels to generate a masked base video frame.

5. The method of claim 4 wherein said step of comparing each pixel comprises the step of comparing the color of each pixel of the video frame to the color of the corresponding pixel of at least one other captured video frame of the group.

6. The method of claim 5 wherein said step of masking out pixels comprises the step of setting the color of pixels in the base video frame corresponding to the identified pixels to a predetermined color.

7. The method of claim 6 wherein said step of setting comprises the step of setting the color of pixels in the base video frame corresponding to the identified pixels to a color that is unlikely to be in close proximity to the end point.

8. The method of claim 4 wherein said step of comparing the current video frame to the masked base video frame comprises the steps of:

for all pixels except for the masked pixels, comparing the red value of each pixel of the current video frame to the red value of each corresponding pixel of the masked base video frame;

for all pixels except for the masked pixels, comparing the green value of each pixel of the current video frame to the green value of each corresponding pixel of the masked base video frame; and for all pixels except for the masked pixels, comparing the blue value of each pixel of the current video frame to the blue value of each corresponding pixel of the masked base video frame.

9. The method of claim 4 wherein said step of comparing the current video frame to the masked base video frame comprises the steps of:

for all pixels except for the masked pixels, determining the absolute values of the differences between the red value of each pixel of the current video frame and the red value of each corresponding pixel of the masked base video frame;

for all pixels except for the masked pixels, determining the absolute values of the differences between the green value of each pixel of the current video frame and the green value of each corresponding pixel of the masked base video frame; and for all pixels except for the masked pixels, determining the absolute values of the differences between the blue value of each pixel of the current video frame and the blue value of each corresponding pixel of the masked base video frame; and generating a difference measurement, said difference measurement comprising the total of the absolute values of the differences for the red, green and blue values.

10. The method of claim 9 and further comprising the step of dividing the difference measurement by the total number of pixels in a frame to generate a normalized difference measurement.

11. The method of claim 10 wherein said step of determining whether the user is currently in close proximity to the end point based on said step of comparing comprises the step of comparing the normalized difference measurement to a threshold value.

12. The method of claim 10 wherein said step of determining whether the user is currently in close proximity to the end point based on said step of comparing comprises the steps of comparing the normalized difference measurement to a threshold value, and concluding that the user is in close proximity only if the normalized difference measurement is greater than the threshold value.

13. The method of claim 2 wherein each said frame comprises a plurality of pixels, said step of masking out natural motion from the base video frame comprises the step of masking out pixels associated with natural motion from the base video frame to generate a masked base video frame, said step of comparing the current video frame of the end point to the masked base video frame of the end point comprises the steps of:

except for the masked pixels, identifying the colors of the pixels in the masked base video frame;

identifying the colors in the current video frame;

comparing the identified pixel colors in the masked base video frame to the identified pixel colors in the current video frame; and based on said step of comparing the identified pixel colors, identifying colors present in the current video frame which are not present in the masked base video frame.

14. The method of claim 13 wherein said step of determining whether the user is currently in close proximity to the end point based on said step of comparing comprises the step of determining whether the user is in close proximity to the end point by comparing the identified colors present in the current video frame which are not present in the masked base frame to a list of colors associated with the user.

15. The method of claim 14 wherein said list of colors associated with the user comprises the user's hair and skin color.

16. The method of claim 2 and further comprising the step of sensing whether a manual input device is in use at the end point.

17. The method of claim 16 wherein said step of sensing whether a manual input device is in use comprises the step of sensing whether a keyboard or pointing device is in use at the end point, and concluding that the user is in close proximity to the end point if the keyboard or pointing device is in use at the end point.

18. The method of claim 2 and further comprising the step of determining whether the base video frame should be updated.

19. A method of detecting whether a user is in close proximity to an end point regardless whether the user is moving comprising the steps of:

capturing a base video frame of the end point when the user is not in close proximity to the end point;

detecting any natural motion at the end point unrelated to the user;

capturing a current video frame of the end point;

except for pixels which correspond to the detected natural motion at the end point, comparing pixels of the current video frame of the end point to corresponding pixels of the base video frame of the end point; and determining whether the user is currently in close proximity to the end point based on said step of comparing.

20. A method of detecting whether a user is in close proximity to an end point regardless whether the user is moving comprising the steps of:
  capturing a base video frame of the end point when the user is not in close proximity to the end point;
  masking out natural motion from the base video frame to generate a masked base video frame;
  sensing whether a manual input device is in use at the end point, and concluding that the user is in close proximity to the end point if the manual input device is in use; and
  performing the following steps if the manual input device is not in use at the end point:
    a) capturing a current video frame of the end point;
    b) comparing the current video frame of the end point to the masked base video frame of the end point; and
    c) determining whether the user is currently in close proximity to the end point based on said step of comparing.

21. A method of detecting whether a user is in close proximity to a first end point regardless whether the user is moving comprising the steps of:
  capturing a base video frame of the end point when the user is not in close proximity to the end point;
  sensing whether a manual input device is in use at the end point, and concluding that the user is in close proximity to the end point if the manual input device is in use; and
  performing the following steps if the manual input device is not in use at the end point:
    a) capturing a current video frame of the end point;
    b) comparing the current video frame of the end point to the base video frame of the end point; and
    c) determining whether the user is currently in close proximity to the end point based on said step b);
    d) if said step c) determines that the user is in close proximity to the end point, then determining whether the base video frame is erroneous; and
    e) updating the base video frame if it is determined that the base video frame is erroneous based on said step d).

22. The method of claim 21 wherein said step b) comprises the steps of:
  calculating a difference measurement between the current video frame and the base video frame; and
  comparing the difference measurement to a first threshold value.

23. The method of claim 22 wherein said step c) comprises the step of concluding that the user is in close proximity to the end point if the difference measurement is greater than said first threshold, and concluding that the user is not in close proximity to the end point if the difference measurement is not greater than the first threshold value.

24. The method of claim 21 wherein said step of determining whether the base video frame is erroneous comprises the steps of:
  setting the current video frame to be a base non-motion video frame;
  capturing a group of video frames over a period of time subsequent to capturing the current video frame, said group comprising one or more video frames; and
  calculating difference measurements between each frame in the group and the base non-motion video frame;
  comparing each of the difference measurements to a second threshold value; and
  concluding that the base video frame is erroneous and should be updated if all the difference measurements are less than the second threshold value.

25. The method of claim 21 wherein said step determining whether the base video frame is erroneous comprises the steps of:
  setting the current video frame to be a base non-motion video frame;
  capturing a group of video frames over a period of time subsequent to capturing the current frame, said group comprising one or more video frames;
  calculating second difference measurements between each frame in the group and the base non-motion video frame;
  comparing each of the second difference measurements to a second threshold value;
  calculating a first difference measurement between the base non-motion video frame and a known video frame when the user was in close proximity to the end point;
  comparing the first difference measurement to a first threshold value; and
  concluding that the base video frame is erroneous and should be updated if all of the second difference measurements are less than the second threshold value and the first difference measurement is less than the first threshold value.

26. The method of claim 25 wherein said step e) comprises the steps of:
  capturing a new base video frame if it is determined that the base video frame is erroneous based on said step d); and
  masking out natural motion from the new base video frame.

27. A computer-readable medium having stored thereon a plurality of instructions, the plurality of instructions including instructions when executed by a processor, result in:
  capturing a base video frame of an end point when a user is not in close proximity to the end point;
  sensing whether a manual input device is in use at the end point, and concluding that the user is in close proximity to the end point if the manual input device is in use; and
  performing the following steps if the manual input device is not in use at the end point:
    a) capturing a current video frame of the end point;
    b) comparing the current video frame of the end point to the base video frame of the end point;
    c) determining whether the user is currently in close proximity to the end point regardless whether the user is moving based on said step b);
    d) if said step c) determines that the user is in close proximity to the end point, then determining whether the base video frame is erroneous; and
    e) updating the base video frame if it is determined that the base video frame is erroneous based on said step d).

28. A computer-readable medium having stored thereon a plurality of instructions, the plurality of instructions including instructions when executed by a processor, result in:
  capturing a base video frame of an end point when a user is not in close proximity to the end point;
  masking out natural motion from the base video frame to generate a masked base video frame;
  capturing a current video frame of the end point;
  comparing the current video frame of the end point to the masked base video frame of the end point; and
  determining whether the user is currently in close proximity to the end point regardless whether the user is moving based on said step of comparing.

29. An apparatus for detecting whether a user is in close proximity to an end point comprising:
- a CPU;
- a memory coupled to the CPU;
- a manual input device coupled to the CPU;
- a video capture device coupled to the CPU and adapted to capture and output video frames of the endpoint; and
- said CPU programmed to perform the following steps:
    - capture a base video frame of the end point when a user is not in close proximity to the end point;
    - mask out natural motion from the base video frame to generate a masked video frame;
    - capture a current video frame of the end point output by said video capture device;
    - compare the current video frame of the end point to the masked base video frame of the end point; and
    - determine whether the user is currently in close proximity to the end point regardless whether the user is moving based on said step of comparing.

30. The apparatus of claim 28 wherein said manual input device comprises one or more of the following:
- a keyboard; and
- a pointing device; and
- wherein said video capture device comprises a video camera.

* * * * *

UNITED STATES PATENT AND TRADEMARK OFFICE
CERTIFICATE OF CORRECTION

PATENT NO. : 5,892,856
DATED : April 6, 1999
INVENTOR(S) : FREDERICK J. COOPER et al.

It is certified that error appears in the above-identified patent and that said Letters Patent is hereby corrected as shown below:

| | |
|---|---|
| Column 2, line 56 | "Windows® 95" should be --Windows® 95-- |
| Column 10, line 52 | "differences is" should be --differences are-- |
| Column 10, line 61 | "In such case" should be --In such a case-- |
| Column 11, line 18 | "FIG. 5, Step 452" should be --FIG. 5, step 452-- |
| Column 11, line 30 | after "to be," delete the word "is" |

Signed and Sealed this

Fifteenth Day of February, 2000

Attest:

Q. TODD DICKINSON

Attesting Officer

Commissioner of Patents and Trademarks